US008537577B2

(12) United States Patent
Djenguerian et al.

(10) Patent No.: US 8,537,577 B2
(45) Date of Patent: *Sep. 17, 2013

(54) METHOD AND APPARATUS TO SELECT A PARAMETER/MODE BASED ON A MEASUREMENT DURING AN INITIALIZATION PERIOD

(75) Inventors: Alex B. Djenguerian, Saratoga, CA (US); Robert J. Mayell, San Francisco, CA (US); Kent Wong, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,615

(22) Filed: Aug. 31, 2012

(65) Prior Publication Data

US 2012/0320639 A1 Dec. 20, 2012

Related U.S. Application Data

(63) Continuation of application No. 13/343,579, filed on Jan. 4, 2012, now Pat. No. 8,279,643, which is a continuation of application No. 12/234,474, filed on Sep. 19, 2008, now Pat. No. 8,116,106.

(51) Int. Cl.
*H02M 1/00* (2007.01)
*G05F 1/00* (2006.01)

(52) U.S. Cl.
USPC ............................................. 363/49; 323/184

(58) Field of Classification Search
USPC ............... 363/21.09, 147; 323/274, 279, 303
See application file for complete search history.

(56) References Cited

U.S. PATENT DOCUMENTS

| | | | |
|---|---|---|---|
| 4,823,070 A | 4/1989 | Nelson | |
| 5,313,381 A | 5/1994 | Balakrishnan | |

(Continued)

FOREIGN PATENT DOCUMENTS

| | | |
|---|---|---|
| CN | 1246215 A | 3/2000 |
| CN | 1424812 A | 6/2003 |

(Continued)

OTHER PUBLICATIONS

"AP3700E Low Power PWM Controller for Off-line Battery Charger," BCD Semiconductor Manufacturing Ltd., Rev. 1.0, Dec. 2007, pp. 1-12.

(Continued)

*Primary Examiner* — Adolf Berhane
*Assistant Examiner* — Gary Nash
(74) *Attorney, Agent, or Firm* — Blakely Sokoloff Taylor & Zafman LLP

(57) ABSTRACT

A power supply includes an energy transfer element coupled between an input and an output. A switch is coupled to an input of the energy transfer element. A threshold detection circuit includes in an integrated circuit coupled to measure a signal from a resistive external circuit coupled between fourth and first external terminals of the integrated circuit during an initialization period after the fourth external terminal has been charged to a supply threshold value. A regulator circuit is coupled between second and fourth external terminals of the integrated circuit. The regulator circuit is coupled to charge the fourth external terminal to the supply threshold value during the initialization period. A selection circuit is coupled to the threshold detection circuit to select a parameter/mode of the integrated circuit in response to the measured signal.

10 Claims, 8 Drawing Sheets

(56) References Cited

U.S. PATENT DOCUMENTS

| | | | |
|---|---|---|---|
| 5,335,162 A | | 8/1994 | Martin-Lopez et al. |
| 5,463,378 A | | 10/1995 | Gibb |
| 5,576,628 A | | 11/1996 | Caliboso et al. |
| 5,585,733 A | * | 12/1996 | Paglione .................. 324/678 |
| 5,812,383 A | | 9/1998 | Majid et al. |
| 5,859,768 A | | 1/1999 | Hall et al. |
| 5,864,473 A | * | 1/1999 | Slack et al. ............ 363/21.08 |
| 6,320,763 B2 | | 11/2001 | Hosotani |
| 6,424,156 B1 | * | 7/2002 | Okamura .................. 324/426 |
| 6,456,103 B1 | | 9/2002 | Eldridge et al. |
| 6,580,622 B2 | | 6/2003 | Balakrishnan et al. |
| 6,954,057 B2 | | 10/2005 | Balakrishnan et al. |
| 7,005,855 B2 | | 2/2006 | Zhu et al. |
| 7,112,978 B1 | * | 9/2006 | Koniaris et al. ........... 324/750.3 |
| 7,148,697 B2 | | 12/2006 | Doljack |
| 7,170,383 B2 | | 1/2007 | Polivka et al. |
| 7,205,824 B2 | | 4/2007 | Disney |
| 7,245,510 B2 | | 7/2007 | Bäurle et al. |
| 7,253,997 B2 | | 8/2007 | Balakrishnan et al. |
| 7,310,048 B2 | | 12/2007 | Balakrishnan et al. |
| 7,385,312 B2 | | 6/2008 | Djenguerian et al. |
| 7,405,954 B2 | | 7/2008 | Bäurle et al. |
| 7,425,834 B2 | * | 9/2008 | Matthews et al. ............ 324/548 |
| 7,804,305 B2 | * | 9/2010 | Matthews et al. ............ 324/658 |
| 2002/0089862 A1 | | 7/2002 | Amei |
| 2003/0107359 A1 | | 6/2003 | Balakrishnan et al. |
| 2003/0234655 A1 | | 12/2003 | Sarma et al. |
| 2004/0069249 A1 | | 4/2004 | Kemp et al. |
| 2004/0212387 A1 | | 10/2004 | Muraya et al. |
| 2004/0264221 A1 | * | 12/2004 | Mori .................. 363/39 |
| 2005/0145030 A1 | | 7/2005 | Elliott et al. |
| 2005/0156588 A1 | * | 7/2005 | Petr .................. 324/117 R |
| 2005/0184711 A1 | | 8/2005 | Chen et al. |
| 2005/0270042 A1 | * | 12/2005 | Doljack .................. 324/686 |
| 2006/0209581 A1 | | 9/2006 | Choi et al. |
| 2007/0046294 A1 | * | 3/2007 | Matthews et al. ............ 324/548 |
| 2010/0073041 A1 | | 3/2010 | Djenguerian et al. |
| 2010/0321039 A1 | | 12/2010 | Matthews et al. |

FOREIGN PATENT DOCUMENTS

| | | |
|---|---|---|
| CN | 1805259 A | 7/2006 |
| CN | 101039071 A | 9/2007 |
| EP | 1 758 234 A2 | 2/2007 |
| JP | 10-014097 | 1/1998 |
| JP | 11-032431 | 2/1999 |
| JP | 11-285244 A | 10/1999 |
| JP | 2001-501440 | 1/2001 |
| JP | 2002-262562 A | 9/2002 |

OTHER PUBLICATIONS

"AP3706 Primary Side Control IC for Off-line Battery Chargers," BCD Semiconductor Manufacturing Ltd., Rev. 1.0, Feb. 2008, pp. 1-12.

"C2472, C2473 and C2474 Datasheet: RDFC Controllers for Offline Applications," Cambridge Semiconductor Ltd., Version DS-1423-0709C, Sep. 26, 2007, pp. 1-18.

"FSDM0465RE, FSDM0565RE, FSDM07652RE—Green Mode Fairchild Power Switch (FPS™)," Fairchild Semiconductor Corp., Rev. 1.0.2, Oct. 2007, pp. 1-20.

"FSEZ1216—Primary-Side-Regulation PWM Controller Integrated Power MOSFET," Fairchild Semiconductor Corp., Rev. 0.1, Mar. 2008, pp. 1-12.

"FSQ0565R, FSQ0765R—Green-Mode Fairchild Power Switch (FPS™) for Quasi-Resonant Operation—Low EMI and High Efficiency," Fairchild Semiconductor Corp., Rev. 1.0.0, Oct. 2007, pp. 1-22.

"ICE3A(B)0365/0565/1065/1565; ICE3A(B)2065/2565; ICE3A0565Z/2065Z; ICE3A(B)2065I/3065I/3565I; ICE3A(B)5065I/5565I; ICE3A(B)2065P/3065P/3565P; ICE3A(B)5065P/5565P—CoolSET™-F3: Off-Line SMPS Current Mode Controller with Integrated 650V Startup Cell/Depletion CoolMOS™," Infineon Technologies AG, Version 2.0, Aug. 24, 2005, pp. 1-31.

"ICE3B0365J, ICE3B0565J, ICE3B1565J—CoolSET™-F3 (Jitter Version): Off-Line SMPS Current Mode Controller with Integrated 650V Startup Cell/Depletion CoolMOS™," Infineon Technologies AG, Version 2.3, May 8, 2006, pp. 1-26.

"iW1690—Low-Power Off-line Digital PWM Controller," iWatt, Inc., Rev. 1.1, Jan. 14, 2008, pp. 1-12.

"iW1692—Low-Power Off-line Digital PWM Controller," iWatt, Inc., Version MK-4008-B, Nov. 20, 2007, pp. 1-18.

"L6566B—Multi-Mode Controller for SMPS," STMicroelectronics, Rev. 1, Aug. 2007, pp. 1-51.

"LD7576/76H/76J/76K—Green-Mode PWM Controller with High-Voltage Start-Up Circuit and Adjustable OLP Delay Time," Leadtrend Technology Corp., Rev. 3, Dec. 5, 2007, pp. 1-20.

"LT3825—Isolated No-Opto Synchronous Flyback Controller with Wide Input Supply Range," Linear Technology Corp., Rev. A, 2007, pp. 1-32.

"NCP1015—Self-Supplied Monolithic Switcher for Low Standby-Power Offline SMPS," ON Semiconductor®: Semiconductor Components Industries, LLC, Rev. 0, Jul. 2007, pp. 1-20.

"NCP1027—High-Voltage Switcher for Medium Power Offline SMPS Featuring Low Standby Power," ON Semiconductor®: Semiconductor Components Industries, LLC, Rev. 2, Jun. 2006, pp. 1-30.

"NCP1028—High-Voltage Switcher for Medium Power Offline SMPS Featuring Low Standby Power," ON Semiconductor®: Semiconductor Components Industries, LLC, Rev. 0, Jan. 2007, pp. 1-29.

"NCP1030, NCP1031—Low Power PWM Controller with On-Chip Power Switch and Start-Up Circuits for 48 V Telecom Systems," ON Semiconductor®: Semiconductor Components Industries, LLC, Rev. 2, Sep. 2003, pp. 1-18.

"NCP1201—PWM Current-Mode Controller for Universal Off-Line Supplies Featuring Low Standby Power with Fault Protection Modes," ON Semiconductor®: Semiconductor Components Industries, LLC, Rev. 0, Jul. 2003, pp. 1-18.

"NCP1230—Low-Standby Power High Performance PWM Controller," ON Semiconductor®: Semiconductor Components Industries, LLC, Rev. 1, Jun. 2004, pp. 1-22.

"NCP1337—PWM Current-Mode Controller for Free Running Quasi-Resonant Operation," ON Semiconductor®: Semiconductor Components Industries, LLC, Rev. P0, Oct. 2005, pp. 1-16.

"OB2358—Current Mode PWM Power Switch," On-Bright Electronics Corp., Version OB_DOC_DS_5800, pp. 1-10.

"SG6741—Highly-Integrated Green-Mode PWM Controller," System General Corp., Version 1.1, Nov. 17, 2006, pp. 1-13.

"SG6859A—Low-Cost, Green-Mode PWM Controller for Flyback Converters," Fairchild Semiconductor Corp., Rev. 1.0.0, Mar. 2008, pp. 1-12.

"SG6860—Low-Cost, Green-Mode PWM Controller for Flyback Converters," Fairchild Semiconductor Corp., Rev. 1.0.1, Mar. 2008, pp. 1-11.

"SGP100—Primary-Side-Control PWM Controller," System General Corp., Version 1.0, Sep. 7, 2006, pp. 1-14.

Van den Broek, V., "STARplug™—Efficient Low Power Supply with the TEA152x," Philips Semiconductors: Philips Electronics N.V., Version 1.0, Application Note AN00055, Sep. 2000, pp. 1-42.

"News Release: Realizing Low Power Consumption (100mW max) at No Load—STRA6200 Series—IC's for Switching Mode Power Supplies (SMPS)," STR-A6200 Datasheet, Sanken Electric Co., Ltd., Mar. 23, 2005, pp. 1-5.

"TEA1654—GreenChip™II SMPS Control IC," Philips Semiconductors: Koninklijke Philips Electronics N.V., May 12, 2003, pp. 1-24.

"TEA1751T; TEA1751LT—GreenChip III SMPS control IC: Product data sheet," NXP Semiconductors B.V., Rev. 01, Jul. 10, 2008, pp. 1-29.

"THX203H—Switching Power Controller IC," THX Micro-Electronics, Sep. 1, 2006, pp. 1-42 (English translation attached).

"TNY274-280—TinySwitch®-III Family Energy Efficient, Offline Switcher with Enhanced Flexibility and Extended Power Range," Power Integrations, Inc., Jun. 2006, pp. 1-24.

"TOP242-250—TOPSwitch®-GX Family Extended Power, Design Flexible, EcoSmart®, Integrated Off-line Switcher," Power Integrations, Inc., Sep. 2002, pp. 1-52 (52 pages).

"TOP252-262—TOPSwitch®-HX Family Enhanced EcoSmart®, Integrated Off-Line Switcher with Advanced Feature Set and Extended Power Range," Power Integrations, Inc., Revision E, Sep. 2008, pp. 1-48.

"TNY263-268—TinySwitch®-II Family Enhanced, Energy Efficient, Low Power Off-line Switcher," Power Integrations, Inc., Apr. 2005, pp. 1-24 (24 pages).

"UC3842—Current-Mode PWM Controller," Phillips Semiconductors Linear Products, Product Specification, Aug. 31, 1994, pp. 1100-1107 (8 pages).

"UCC28061—Natural Interleaving™ Transition-Mode PFC Controller With Improved Audible Noise Immunity," Texas Instruments Inc., Jun. 2008, pp. 1-34.

"UCC28230; UCC28231—Advanced PWM Controller for Bus Converters," Texas Instruments Inc., Feb. 2008, Revised Jun. 2008, pp. 1-46.

"VIPER17—Off-line High Voltage Converters," STMicroelectronics, Rev. 2, Feb. 2008, pp. 1-31.

"VIPer22ADIP-E, VIPer22AS-E—Low Power OFF-Line SMPS Primary Switcher," STMicroelectronics, Rev. 1, Feb. 2006, pp. 1-20.

"VIPer53EDIP-E, VIPer53ESP-E—OFF-Line Primary Switch," STMicroelectronics, Rev. 1, Jan. 2006, pp. 1-31.

EP 06 25 4462—Partial European Search Report and Written Opinion, dated Nov. 16, 2009 (8 pages).

EP 06 25 4462—European Search Report and Written Opinion, dated Jan. 26, 2010 (13 pages).

EP 09 17 0551—European Search Report and Written Opinion dated Jul. 29, 2010 (6 pages).

First Chinese Office Action, Application No. 200610146376.9, Office Action mailed Jul. 3, 2009 (10 pages).

Second Chinese Office Action, Application No. 200610146376.9, Office Action mailed Jul. 4, 2011 (12 pages).

First Japanese Office Action, Application No. 2006-230382, mailed Aug. 21, 2012 (4 pages).

CN200910169094.4—Chinese First Office Action and Search Reported with English Translation, issued Feb. 17, 2013 (23 pages).

* cited by examiner

FIG. 6B →

METHOD AND APPARATUS TO SELECT A PARAMETER/MODE BASED ON A MEASUREMENT DURING AN INITIALIZATION PERIOD

REFERENCE TO PRIOR APPLICATION(S)

This is a continuation of U.S. application Ser. No. 13/343,579, filed Jan. 4, 2012, now pending, which is a continuation of U.S. application Ser. No. 12/234,474, filed Sep. 19, 2008, now issued U.S. Pat. No. 8,116,106. U.S. application Ser. No. 13/343,579 and U.S. Pat. No. 8,116,106 are hereby incorporated by reference.

BACKGROUND INFORMATION

1. Field of the Disclosure

The present invention relates generally to electronic circuits, and more specifically, the invention relates to integrated circuits in which functional parameters and/or operating modes are set.

2. Background

Integrated circuits may be used for a multitude of purposes and applications. In order to provide increased flexibility, circuit designers sometimes design the integrated circuits to have a variety of different operating modes and/or to have the ability to function with a variety of different operating parameters. In order for the different functional parameters and/or operating modes to be set in the integrated circuit, the integrated circuit chip is typically designed and manufactured with an additional one or more terminals in the packaging to which additional circuit elements or signals could be coupled in order to set or select the desired functional parameters and/or operating modes of the integrated circuit. In the alternative, a separate product part could be designed or manufactured with a different integrated circuit for each particular functional parameter and operating mode setting designed directly into the circuitry of the integrated circuit.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

DETAILED DESCRIPTION

Figure 1:
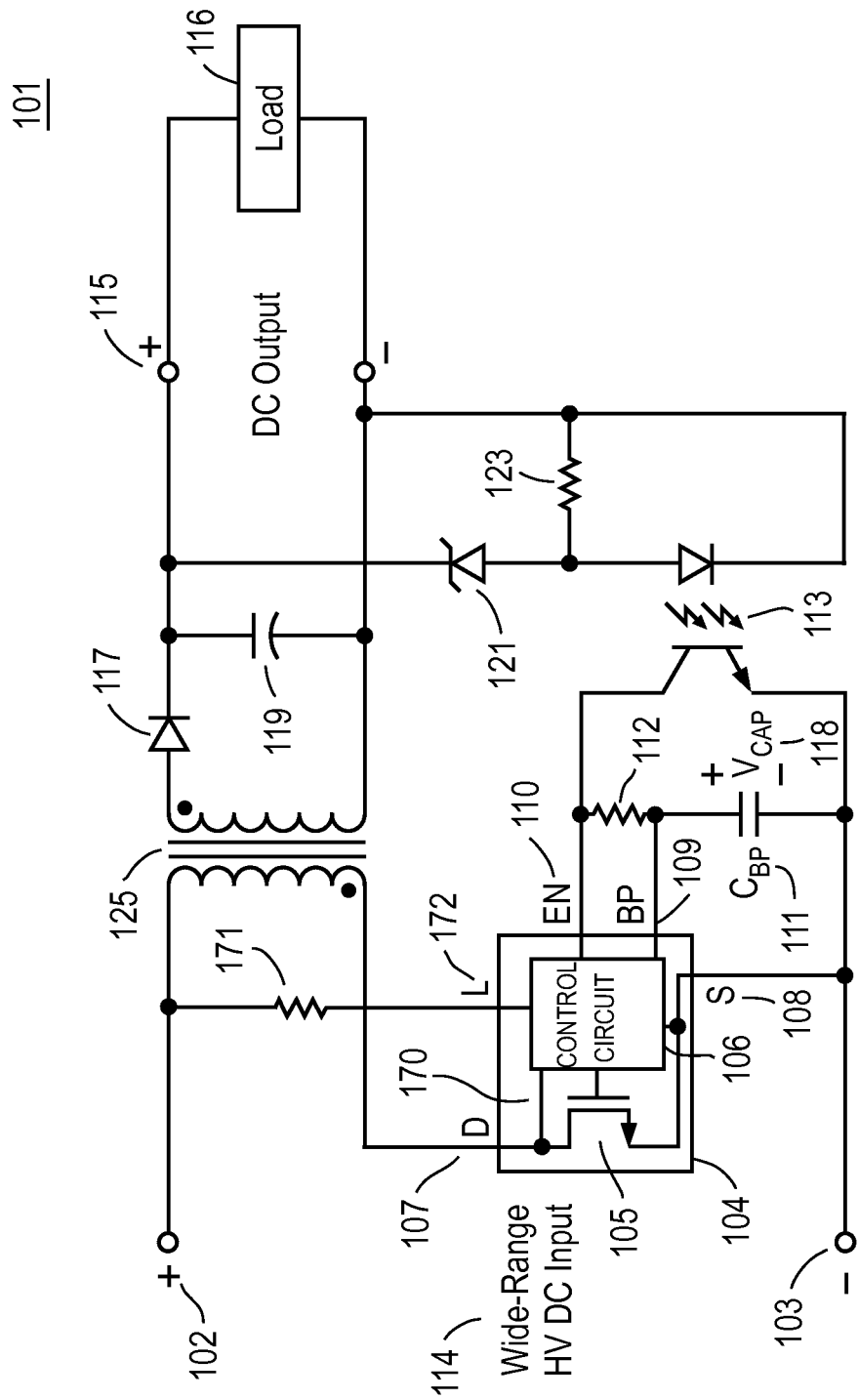
FIG. 1 is a schematic of an example power supply using a power supply control circuit in accordance with the teachings of the present invention.

Methods and apparatuses for an integrated circuit in which a signal at an external terminal of the integrated circuit is measured during an initialization period of the integrated circuit to set a parameter/mode of the integrated circuit are disclosed. In one example, the terminal is used during the operation of the integrated circuit following the initialization period for at least one other function. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment or example is included in at least one embodiment of the present invention. Thus, appearances of the phrases "in one embodiment," "in an embodiment," "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As will be discussed, functional parameters or operating modes of an integrated circuit may be selected during a mode selection or functional parameter specification setting period during the initialization period for an example of an integrated circuit in accordance with the teachings of the present invention. For one example, the costs associated with either having additional dedicated pins or external terminals on the chip package or having separate product part numbers for the purpose of addressing various different device functional parameter specifications or operating modes is saved. For instance, device functional parameter specifications may instead be selected using an existing external terminal by measuring a signal received on that external terminal during an initialization period of the integrated circuit.

Accordingly, selecting from a plurality of functional parameters and/or operating modes may be provided with a single chip or integrated circuit by choosing, for example, a value of a current flowing in a resistor coupled to an external terminal of the integrated circuit during an initialization period of the integrated circuit. During normal operation after the initialization period, the external terminal has a function of something other than detecting the current flowing in the resistor to select from a plurality of functional parameters, operating modes or other device characteristics. For example, the same external terminal could be used to receive a feedback signal during the normal operation of the integrated circuit. A single pin or external terminal of an integrated circuit can therefore be used as a feedback terminal during normal operation and as an input to set a parameter/mode during an initialization period of the integrated circuit in accordance with the teachings of the present invention.

To illustrate, FIG. 1 shows a simplified schematic diagram of an example power supply circuit 101 in accordance with the teachings of the present invention. As shown, integrated circuit 104 includes a control circuit 106 coupled to drive a switch 105. In the illustrated example, switch 105 is coupled between an external drain terminal 107 and an external source terminal 108 of the integrated circuit 104. As shown, switch 105 is therefore coupled to an input of energy transfer element 125 through external drain terminal 107. Control circuit 106 is coupled to receive a feedback signal at external EN terminal 110 during the normal operation of the integrated circuit 104. Control circuit 106 regulates the switching of switch 105 in response to the feedback signal received at EN terminal 110 of integrated circuit 104 to regulate energy flow from input terminals 102 and 103 of power supply circuit 101 through energy transfer element 125 to the load 116 coupled to the output of energy transfer element 125. In the example, the feedback signal is generated by feedback circuitry elements 121, 123 and 113, which are coupled to provide a feedback signal responsive to the output voltage appearing across load 116. In other examples, the feedback signal could be responsive to a current flowing in the load 116.

In operation, when the DC input voltage 114 is first applied to the input terminals 102 and 103, the integrated circuit 104 first charges up supply capacitor $C_{BP}$ 111 through an external BP terminal 109 of integrated circuit 104. A voltage $V_{CAP}$ 118 across the capacitor $C_{BP}$ 111 is increased to a threshold value that is high enough for the integrated circuit 104 to operate correctly. In one example, the value of this $V_{CAP}$ 118 threshold voltage 5.8V. In order for the example integrated circuit 104 to operate, a connection 170 between the Drain terminal 107 of switch 105 and the control circuit 106 is used to draw current from the Drain terminal 107 to initially charge capacitor $C_{BP}$ 111. In another example, connection 170 is a connection from within the structure of switch 105, but is shown however in the example shown in FIG. 1 as a separate connection for ease of explanation.

When the voltage across capacitor $C_{BP}$ 111 has reached the threshold value, control circuit 106 is ready to start switching switch 105 in order to start transferring energy from input terminals 102 and 103 to the output load 116. However, in accordance with the teachings of the present invention, in one example the control circuit 106 includes circuitry to delay the start of switching of switch 105 for an initialization period. In one example, the initialization period is a period of 25 to 50 nanoseconds. In one example, during this initialization period, the control circuit 106 receives a current flowing in EN terminal 110 through an external circuit coupled to EN terminal 110. In the example shown in FIG. 1, the external circuit through which current flows to EN terminal 110 includes a resistor 112.

In accordance with the teachings of the present invention, the current flowing though EN terminal 110 during the initialization period is a parameter/mode selection signal. In the example, the control circuit 106 selects a parameter/mode of the integrated circuit 104 in response to the value of the parameter/mode selection signal. Following the initialization period, the integrated circuit 104 starts its normal operation where control circuit 106 switches or commutates switch 105 to regulate energy flow in the energy transfer element 125 in response to a feedback signal generated by other circuitry coupled to EN terminal 110, such as for example optocoupler 113 in FIG. 1. Integrated circuit 104 therefore utilizes EN terminal 110 for an additional function after setting the parameter/mode during the initialization period in accordance with the teachings of the present invention.

In one example, the parameter/mode of integrated circuit 104 that is set during the initialization period described above is a peak threshold level of a current flowing in switch 105 during the normal operation of integrated circuit 104. In another example, the parameter/mode of integrated circuit 104 that is set during the initialization period comprises an adjustment of a peak threshold level of current flowing in switch 105 as a function of the value of the input voltage 114 coupled to the input of the power supply 101, during normal operation of integrated circuit 104.

In yet another example, the parameter/mode of integrated circuit 104 that is set during the initialization period includes setting both an adjustment of a peak threshold level of current flowing in switch 105 as a function of the value of the input voltage 114 coupled to the input of the power supply 101 as well as a specific threshold level of current in switch 105 at one value of the input voltage 114. Setting threshold levels of the peak current in switch 105 is important to set the maximum output power capability of the power supply 101 to suit particular applications of the power supply 101. Setting the adjustment of peak current in switch 105 as a function of input voltage 114 is important to compensate for the effects of input voltage and maintain a substantially constant maximum output power of the power supply 101 across a wide range of input voltage 114 values. This is desirable to reduce the cost of many components such as the energy transfer element 125, output diode 117 and output capacitor 119, which would otherwise have to be designed to cope with increased maximum output power as the input voltage 114 rises.

In one example, a current flowing through a resistor 171 coupled between the control circuit 106 and the input positive supply rail 102 through external L terminal 172 is used by the control circuit 106 to detect the value of input voltage 114. The degree of peak switch current reduction with increasing input voltage 114 can then be determined according to the value of the signal received at L terminal 172 and the adjustment parameter set during the initialization period described above. In one example where two adjustment levels are provided by control circuit 106, the peak current level in switch 105 at the highest value of input voltage 114 could be reduced by 10% or 20% compared to that at the lowest value of input voltage 114, depending on the value of resistor 112. In other configurations, a plurality of adjustment settings of peak switch current as a function of input voltage as well as peak switch current at a specific value of the input voltage can be set.

It should be noted that in other example configurations where connection 170 is not included, such as for example when control circuit 106 and switch 105 are not part of the same integrated circuit, resistor 171 could also be used to provide initial start up current from the input positive supply rail 102 to charge supply capacitor $C_{BP}$ 111, while still benefiting from the teachings of the present invention.

In the illustrated examples, it is noted that the current flowing in resistor 112 does not influence significantly the function of EN terminal 110 during normal operation of the control circuit 106 after the initialization period in accordance with the teachings of the present invention. For instance, the measurement circuitry included in one example of control circuit 106 is designed to set thresholds for the parameter/mode selection at signal values that are an order of magnitude or more lower than the signal values that will be present during the normal operation of the control circuit 106 after the initialization period. In one example of the circuit of FIG. 1, parameter/mode selection threshold currents of 5, 10 and 20 uA are used to select four parameters/modes during the initialization period, whereas the feedback current signal flowing in EN terminal 110 during normal operation is in the range of 100 to 250 uA. In addition, in the circuit example of FIG. 1, the current flow during the initialization period and during normal operation is of opposite polarity, though that is not necessary to benefit from the teachings of the present invention. It is appreciated that in other examples a different number n thresholds could be used to provide a selection of n+1 parameter/modes while still benefiting from the teachings of the present invention.

Figure 2:
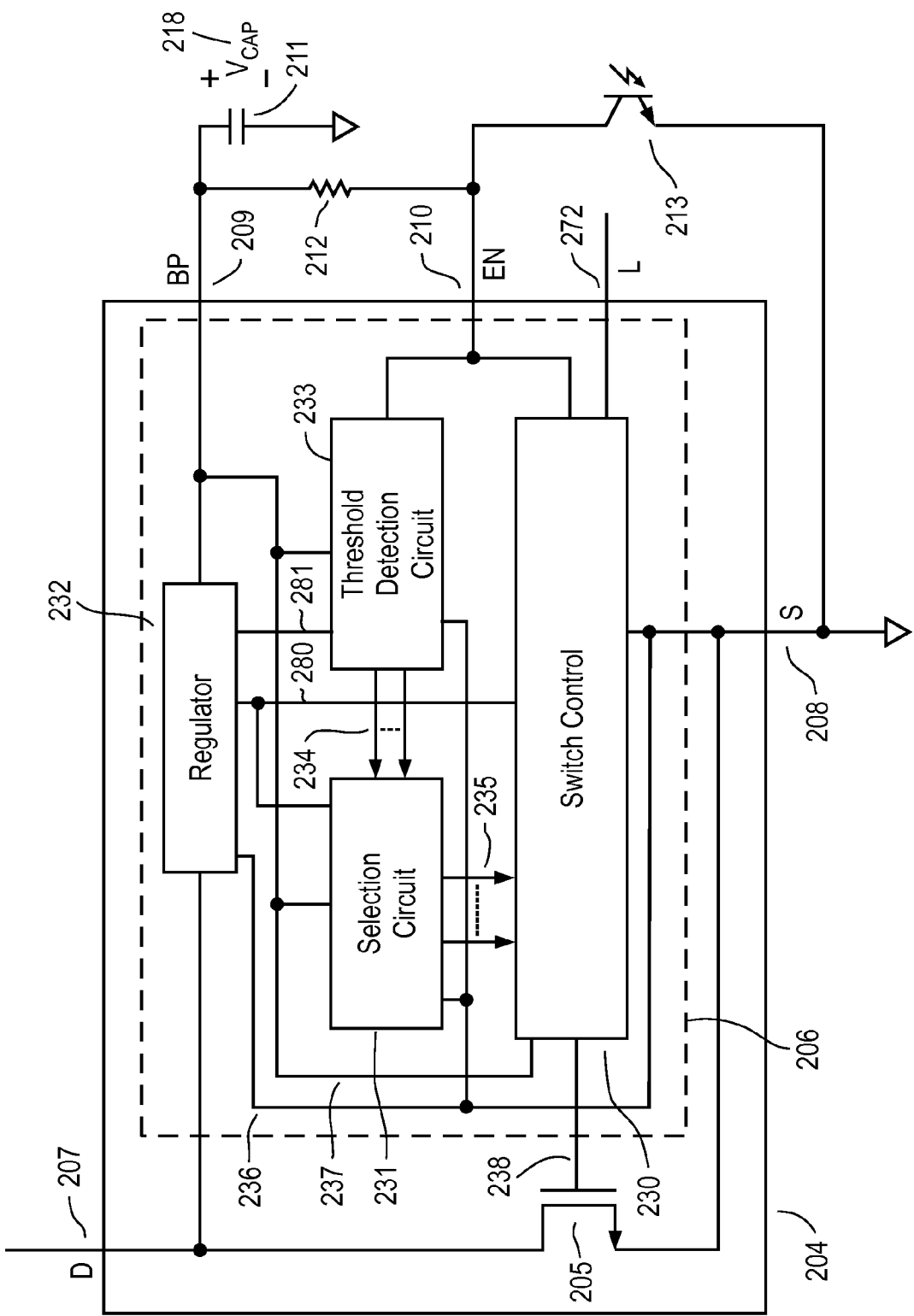
FIG. 2 is a block diagram of an example integrated circuit in accordance with the teachings of the present invention.
Figure 3:
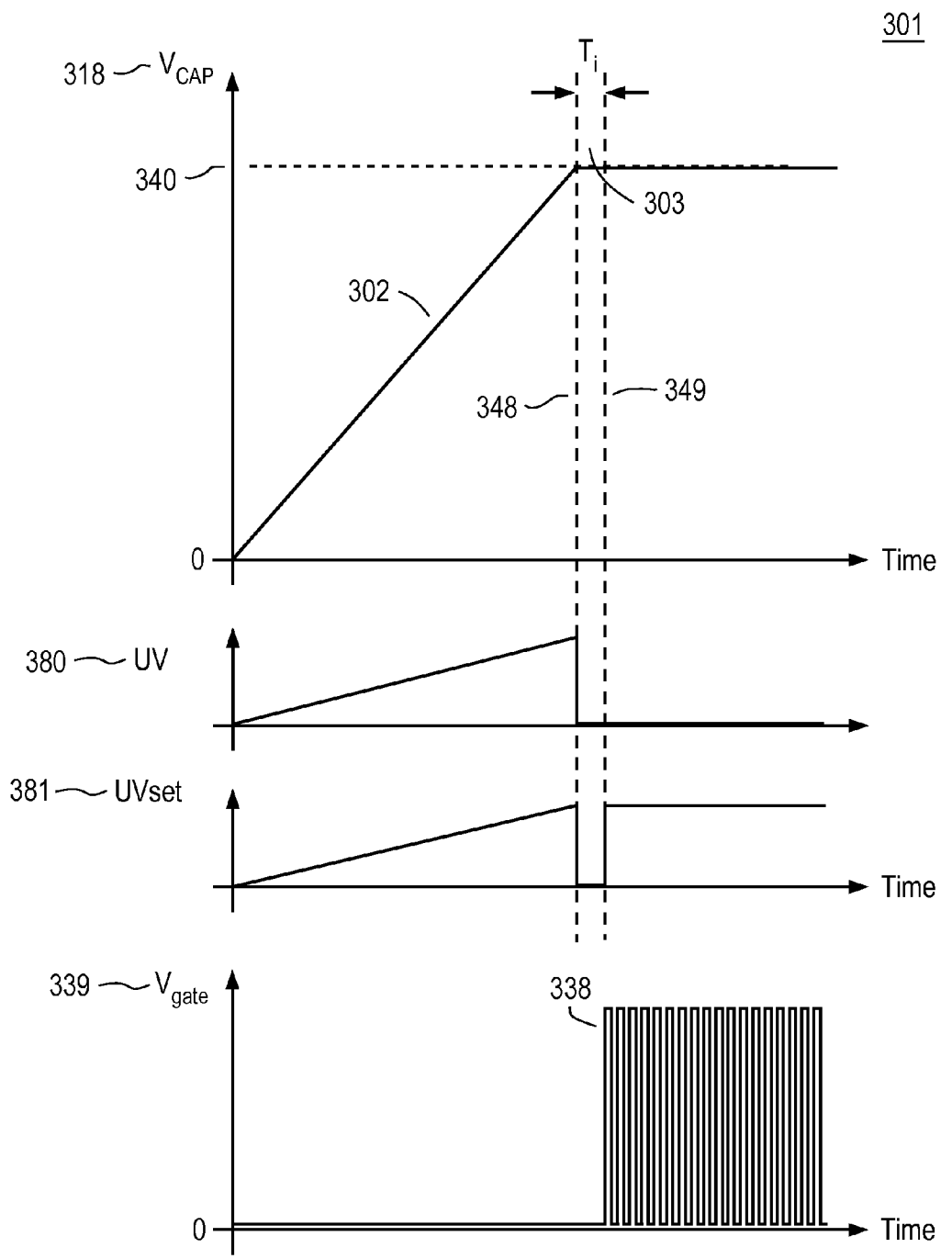
FIG. 3 shows timing diagrams illustrating the operation of an example integrated circuit in accordance with the teachings of the present invention.

FIG. 2 shows a simplified block diagram of an example integrated circuit 204, which in one example is similar to integrated circuit 104 in FIG. 1. FIG. 3 shows example start up and initialization period timing waveforms and will also be referred to in the following description.

The integrated circuit 204 example of FIG. 2 includes both a control circuit 206 and a switch 205. It is appreciated that in another example, switch 205 and control circuit 206 could be separate discrete components, but would still benefit from the teachings of the present invention. As shown in the depicted example, control circuit 206 includes regulator 232 coupled to Drain terminal 207 of switch 205 and to BP terminal 209, which is the external supply terminal of control circuit 206. Regulator circuit 232 draws current from Drain terminal 207 to initially charge capacitor 211 through BP terminal 209. Regulator circuit 232 outputs a UV signal 280, which goes low when the BP terminal 209 reaches a threshold value at start up. In one example the threshold value is 5.8V.

This is illustrated in FIG. 3 where the BP terminal 209 voltage waveform 302 rises to threshold value 340 at time 348 at which time the UV signal 380, which also rises with BP voltage waveform 302, goes low. It is recognized that in an actual circuit implementation signals may go high or low depending on the polarities determined during the circuit design, while giving the same functionality. Regulator circuit 232 also generates a UVset 281 signal shown as signal 381 in FIG. 3. This generates an output that is low for the duration of initialization period 303 and is used to set the output of threshold detection circuit 233 based on the measured signal present at terminal 210 during the initialization period 303.

In the example, the signal present at terminal 210 during the initialization period 303 is substantially the current flowing through resistor 212 coupled between BP terminal 209 and EN terminal 201 of integrated circuit 204. It is appreciated that in other examples the resistor 212 could be coupled between the EN feedback terminal 210 and any source of DC voltage while benefiting from the teachings of the present inventions. It is further appreciated that with an alternative external circuit configuration, the signal present at terminal 210 during initialization period 303 could be voltage while still benefiting from the teachings of the present invention. Threshold detection circuit 233 outputs one or more signals 234 to be received by selection circuit 231 in response to the current flowing through resistor 212 and through EN terminal 210. Selection circuit 231 in turn outputs one or more parameter/mode setting signals 235 to switch control circuit 230 in response to the one or more signals 234. In one example, the number of signals 235 is based on the number of parameter/modes to be set in the switch control circuit 230. It should be noted that although not shown to simplify the diagrams, UVset 281 signal may also be used in one example to disable switch control circuit 230 during the initialization period to allow the parameter/mode selection to have taken place before the normal operation of integrated circuit 204 starts.

When normal operation of integrated circuit 204 does start at time 349 in FIG. 3, the gate 238 of switch 205 begins receiving an active gate drive waveform as represented by waveform 338 in FIG. 3. It is appreciated that the waveform 338 illustrated in FIG. 3 is a representation only. The relative high/low duty of the waveform 338 would vary depending on the actual application conditions. Since UVset signal 381 is high for all time after time 349 in FIG. 3, subsequent selection or programming signals present at EN terminal 210 in FIG. 2 are ignored by threshold detection circuit 233. As described with reference to FIG. 1, EN terminal 210 is further coupled to one or more additional external circuits, each of which may include one or more components that may include, in one example, a feedback circuit such as an optocoupler. The one or more additional external circuits are coupled to provide one or more signals at the EN terminal 210 at times other than the initialization period 303, to provide at least one additional function for the integrated circuit 204 after the initialization period 303 is complete. In one example, the one additional function is a feedback terminal function illustrated in FIG. 2 by the coupling of opto coupler 213 coupled to the EN feedback terminal 210.

Figure 4:
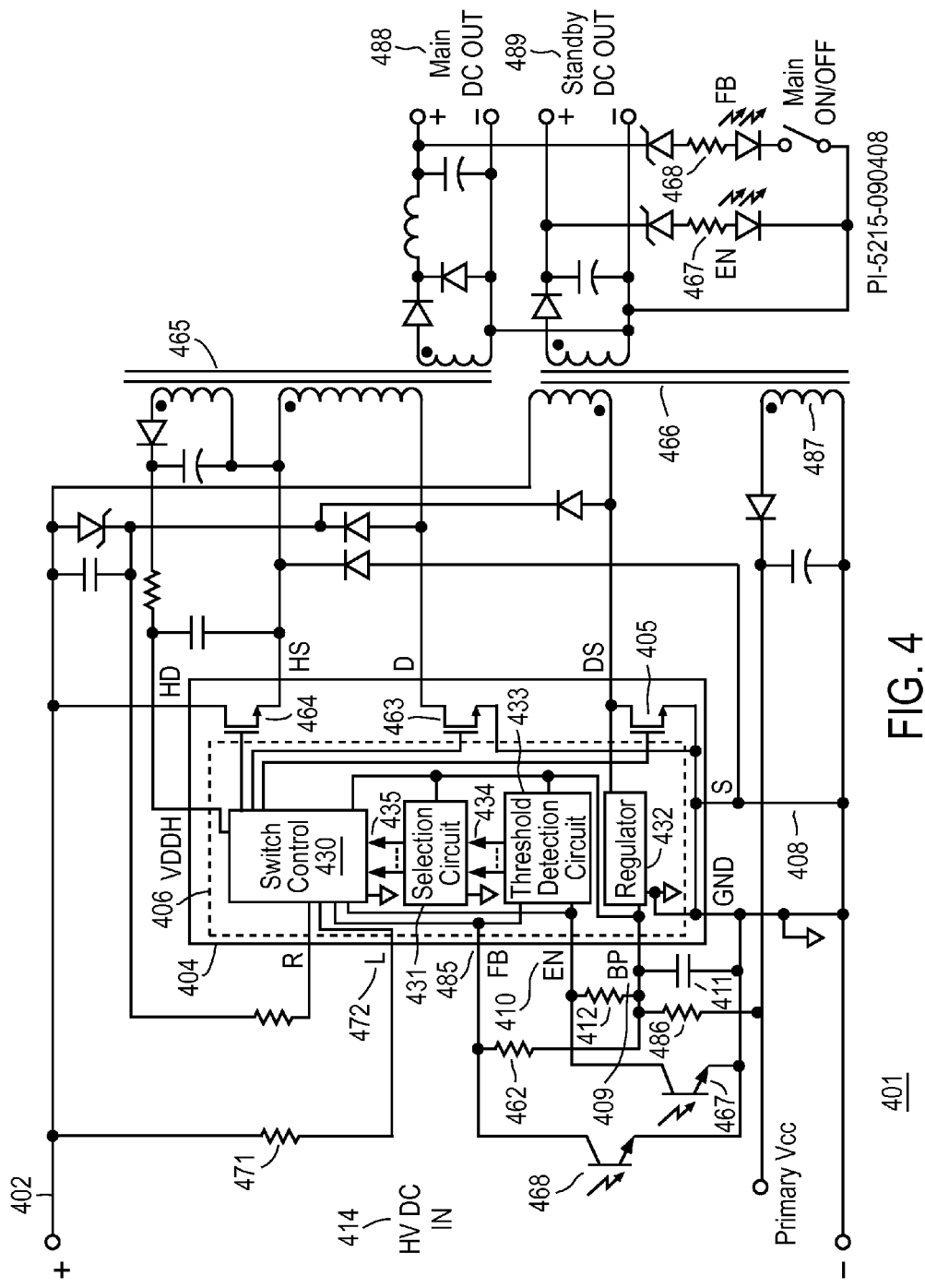
FIG. 4 is a circuit diagram of an example power converter employing another power supply control circuit in accordance with the teachings of the present invention.

FIG. 4 shows another simplified example power supply schematic including a simplified block diagram of an integrated circuit 404 including a control circuit 406 and, in the example shown, three switches 405, 463 and 464. In one example integrated circuit 404 could be used in a personal computer power supply where the system requires both main and auxiliary or standby power converters. Example control circuit 406 combines the control circuitry for both main and standby converters. In the example, power switches 463 and 464 are coupled to the main power converter transformer 465, the output of which is coupled to generate Main DC OUT voltage 488. The main converter output voltage 488 is coupled to optocoupler 468 to generate a feedback signal at feedback terminal FB 485 in order to control the value of output voltage 488.

In the example, power switch 405 is coupled to the standby power converter transformer 466, the output of which is coupled to generated Standby DC OUT voltage 489. The standby converter output voltage 489 is coupled to optocoupler 467 to generate a feedback signal at feedback terminal EN 410 in order to control the value of output voltage 489.

In the example of FIG. 4, threshold detection circuit 433 is coupled to receive signals at both terminals 410 and 485 during the initialization period of integrated circuit 404 in accordance with the teachings of the present invention. In this way parameter/modes can be set for either or both the main and standby converter control. In the example therefore, both resistors 412 and 462 are selected to set parameter/modes during the initialization period in accordance with the teachings of the present invention. However, the operation of control circuit 406 during the start up and initialization period shares many aspects with the descriptions of the more simple control circuit examples discussed in FIGS. 1, 2 and 3. In the example, therefore signals at both terminals 410 and 485 are measured by threshold detection circuit 433 during an initialization period that is started when regulation circuit 432 has charged BP capacitor 411 to a threshold value when input voltage 414 is first introduced to the input of power supply 401. In one example, during the normal operation of integrated circuit 404, FB terminal 485 has a substantially high voltage relative to source potential 408 than EN terminal 410. For this reason, in one example, during the initialization period of integrated circuit 404, the voltage of FB terminal 485 relative to source potential 408 is reduced by the action of circuitry internal to integrated circuitry 404 not shown. This reduction in the voltage of terminal 485 reduces the influence of leakage current flow in opto coupler 468 that could otherwise influence the accuracy of the measurement of the signal at terminal 485 during the initialization period of integrated circuit 404.

During the initialization period, threshold detection circuit 433 outputs one or more signals 434 coupled to selection circuit 431 in response to the signals at terminals 410 and 485. Selection circuit 431 outputs one or more parameter/mode selection signals 435 to switch control circuit 430 in response to the one or more signal 434 from selection circuit 431. In common with the control circuit of FIG. 2, timing signals are generated to ensure that initialization and parameter/mode selection is complete before the switch control circuit 430 initiates switching of switches 405, 463 and 464. These signals are not shown in FIG. 4 to simplify the diagram. In common with the circuit of FIG. 1, the integrated circuit 404 of FIG. 4 is coupled to the positive supply voltage rail 402 through a resistor 471 to L terminal 472. The current flowing in resistor 471 is a function of the input voltage 414 and this signal can therefore be used to adjust a peak current threshold value in all or some of switches 405, 463, 464. In one example, one of the parameter/modes that can be selected through the choice of resistors 412 and 462 is an adjustment of a peak current threshold level of currents flowing in one or more of the switches 405, 463 and 464, as a function of the input voltage 414 in accordance with the teachings of the present invention.

Figure 5:
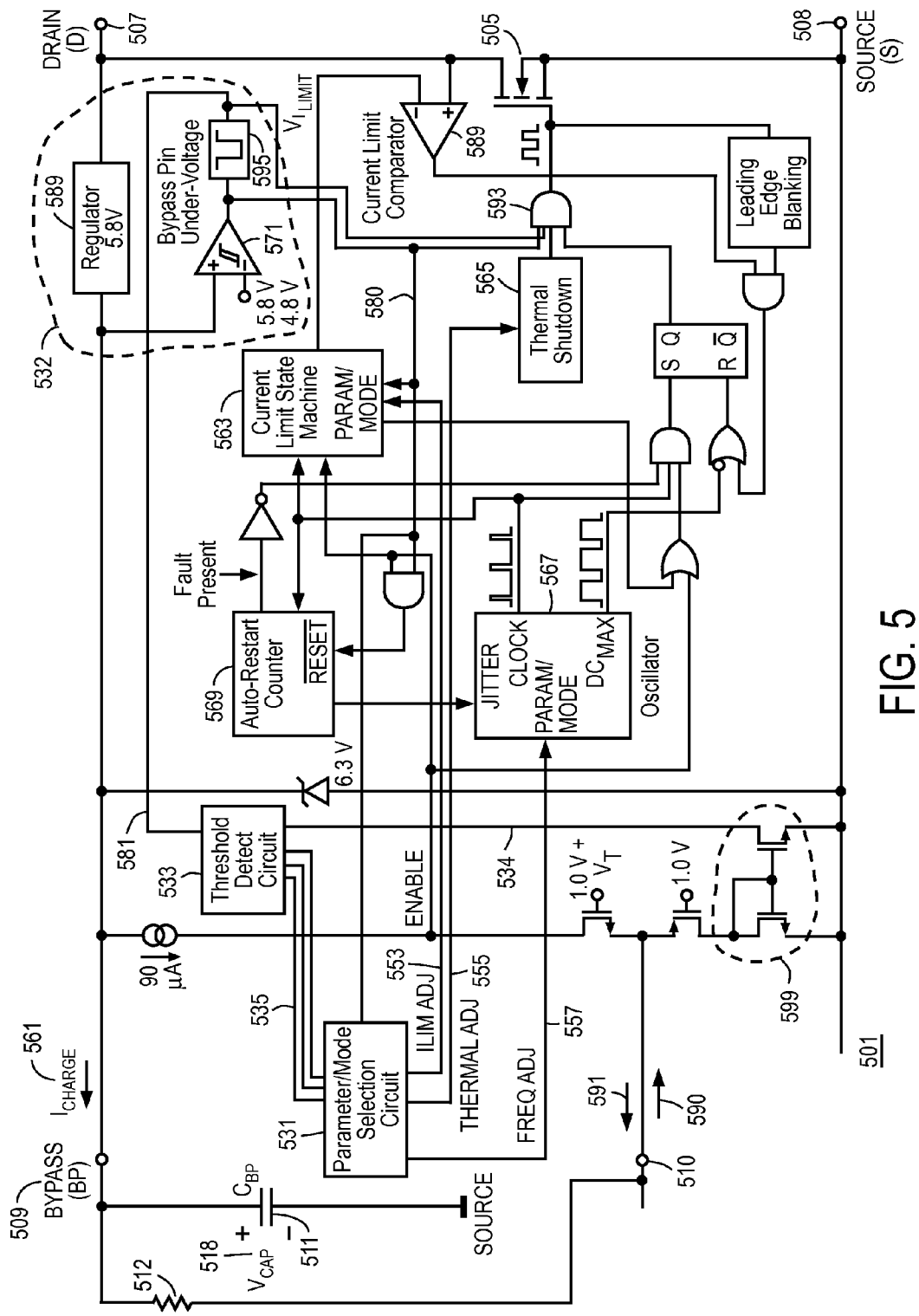
FIG. 5 is a detailed internal block diagram with an example power supply control circuit in accordance with the teachings of the present invention.

FIG. 5 shows another block diagram of an example power supply control circuit in accordance with the teachings of the present invention. The control circuit of FIG. 5 shares many aspects of the block diagram of FIG. 2. At start up, the regulator circuit 532 draws current $I_{charge}$ 561 from the Drain terminal 507 of switch 505, to charge the capacitor 511 coupled to BP terminal 509. When the under voltage threshold of comparator 571 is reached, the output signal 580 goes high. However, circuit 595 generates an initialization pulse that temporarily disables switching of switch 505 while the threshold detect circuit 533 detects signal 534.

Signal 534 is generated by current mirror 599, which mirrors current 590 flowing into the EN terminal 510 through external resistor 512 during the initialization period. In other examples, signal 534 could be made up of a plurality of signals generated from a plurality of current mirror outputs as will be shown in the example illustrated in FIG. 6. Threshold detect circuit 533 outputs signals 535, which are coupled to parameter/mode selection circuit 531. Parameter/mode selection circuit 531 provides outputs to the remaining circuitry in the schematic of FIG. 5 that collectively make up the switch control circuitry of control circuit 501.

In the example illustrated in FIG. 5, the outputs of parameter/mode selection circuit 531 include signal 553 to adjust a current limit level for setting a peak current threshold for current flowing in switch 505 current, signal 557 to adjust a frequency of an internal oscillator 567 and signal 555 to adjust a thermal shutdown protection threshold of circuit 565.

In the example shown in FIG. 5, the example control circuit 501 uses an on/off mode of control in which cycles of the switch 505 are skipped or enabled to regulate energy delivery in the power supply circuit in which is it used. As such, the frequency adjust signal 557 sets a maximum switching frequency of the switch 505 when no cycles are skipped at maximum output power conditions. It is appreciated that any parameters or modes of operation could be set using the teachings of the present invention and that the circuits shown in FIG. 5 illustrate just a few examples for explanation purposes.

Figure 6A:
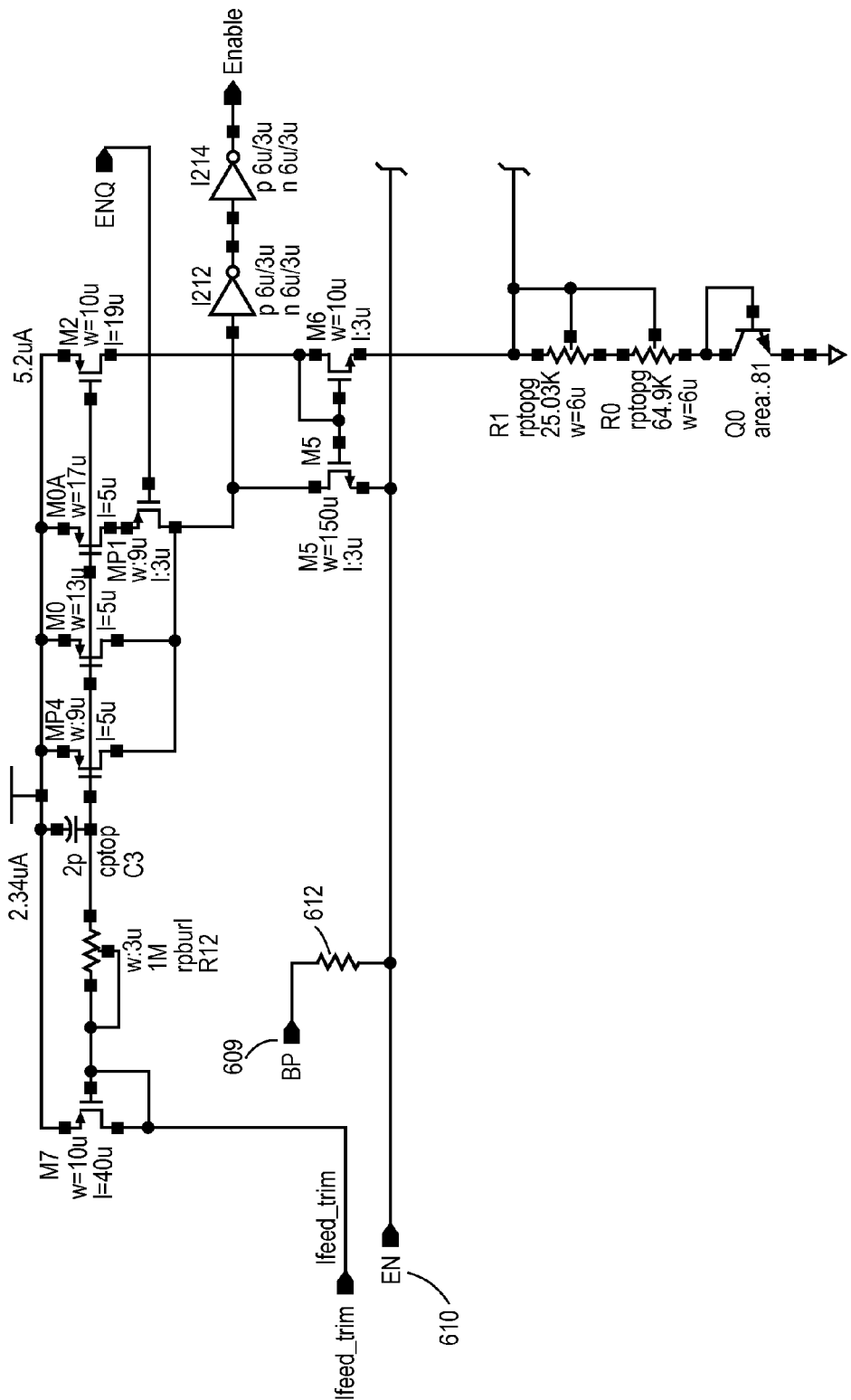
FIG. 6 is a detail circuit schematic showing a portion of an example integrated circuit configuration in accordance with the teachings of the present invention.
Figure 6B:
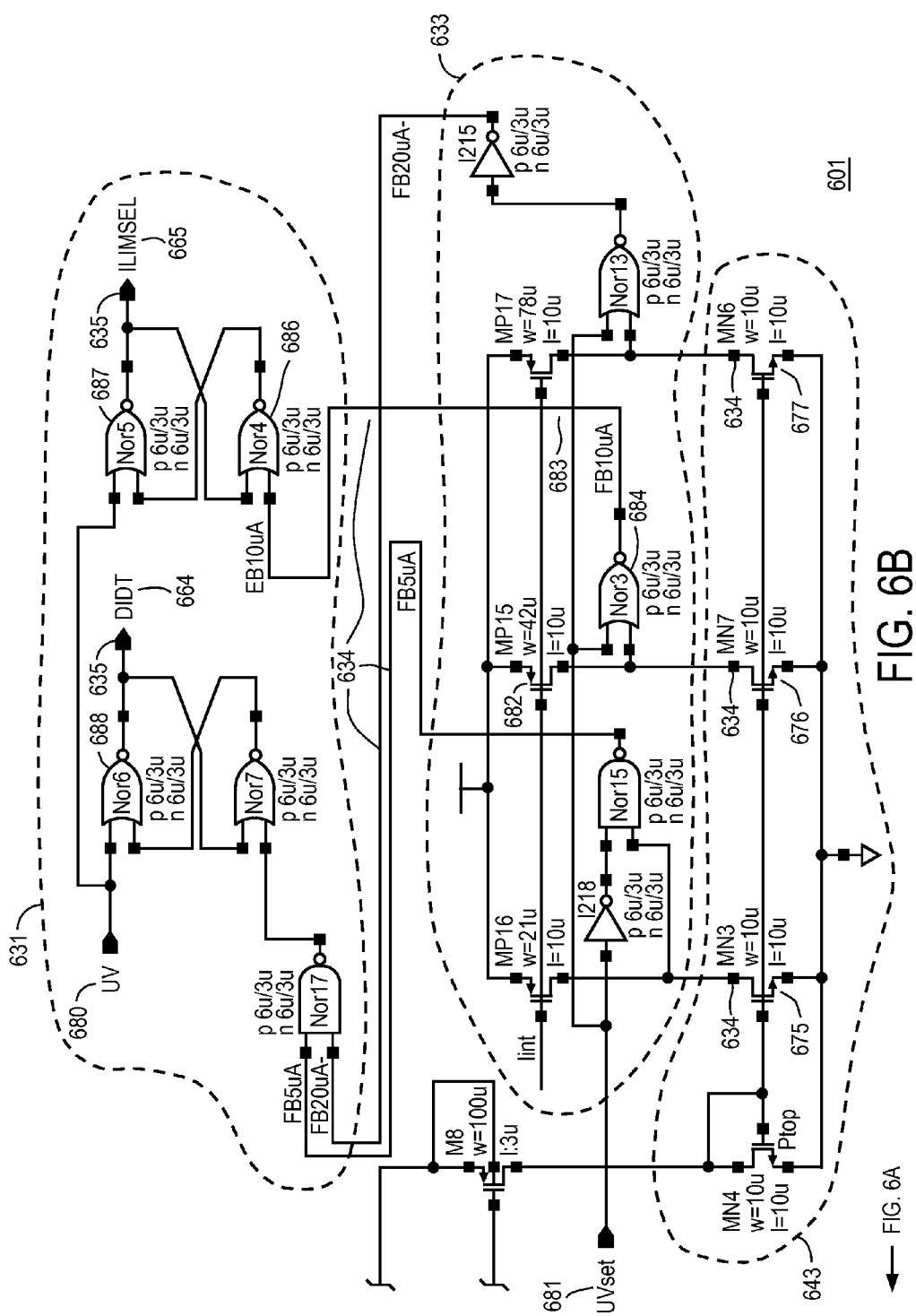

FIG. 6 shows a detailed schematic 601 of a portion of one example of control circuit in accordance with the teachings of the present invention such as the control circuit 406 of FIG. 4. The discussion below is focused on specific aspects of the example circuit illustrated in FIG. 6 in accordance with the teachings of the present invention. In the illustrated example, EN node 610 and BP node 609 are coupled to external terminals or pins of the control circuit and resistor 612 is an external resistor coupled between the pins to provide the parameter/mode selection signal discussed above with reference to FIGS. 1 to 5.

During an initialization period of the control circuit 601 in FIG. 6, the current flowing through resistor 612 is mirrored by current mirror circuit 643 and applied to threshold detection circuit 633 through signals 634 flowing through transistors 675, 676 and 677. When signal UVset 681 goes low, the outputs of threshold detection circuit 633 are set. In one example, this is similar to UVset signal 281 in FIGS. 2 and 3. The output signals 634 from threshold set circuit 633 are coupled to inputs of selection circuit 631. When UV signal 680 is high at the start of the initialization period the outputs 664 and 665 of selection circuit 631 are also held low by the action of NOR gates 688 and 687. The description below describes how the signal generated by the operation of one of the current mirror transistors 676 in current mirror circuit 643, sets the output of NOR gate 687. It will be appreciated that similar explanations can be applied to the signals generated by other current mirror transistors 675 and 677.

In the illustrated example, transistor 682 is a current source, which in the example is a 10 uA current source. If the current flowing in transistor 676 exceeds 10 uA, the voltage across transistor 676 is therefore low providing a low input signal an input of NOR gate 684. When UVset signal 681 goes low, for example at time 348 in FIG. 3, the inverse of the polarity of the voltage at the Drain of transistor 676 is passed through NOR gate 684 for the duration of the period for which UVset signal 681 remains low, which in one example is for the duration of initialization period 303 in FIG. 3. If the Drain of transistor 676 is low during this initialization period, the signal 683 therefore goes high at the output of NOR gate 684. This output high signal is applied to an input of NOR gate 686. As described above, the output of NOR gate 687 is held low while UV signal 680 is high and output of NOR gate 686 is therefore the inverse polarity of signal 683. When UV signal 680 goes low, for example at time 348 in FIG. 3, output 665 therefore follows the inverse polarity of the output of NOR gate 686, which from the above description was until this time the inverse of the polarity of signal 683. In the example therefore, the output signal 665 takes on the polarity of signal 683 during the initialization period, which in one example could be period 303 in FIG. 3. The outputs of selection circuit 631 are applied to the input of a switch control circuit, which is not shown in FIG. 6, but could in one example be similar to switch control circuit 430 in FIG. 4 or switch control circuit 230 in FIG. 2. In the example, two levels of a peak current threshold of a switch coupled to the control circuit 601 are set depending on the polarity of output signal 665. In addition, output signal 664 sets one of two levels of an adjustment of the peak current threshold as a function of a voltage input to the power supply in which control circuitry 601 is used in accordance with the teachings of the present invention.

It is appreciated that circuitry similar to that shown in FIG. 6 could be employed coupled to FB terminal 485 of integrated circuit 404 in FIG. 4 to provide functionality similar to that described above with reference to circuitry 601 in FIG. 6.

In the descriptions above, it is noted that the function of the terminal during normal operation of the integrated circuit has been as a feedback terminal for explanation purposes. It is appreciated however that any terminal could be used that can receive a signal during an initialization period of the integrated circuit to set parameter/modes of the integrated circuit and then subsequently receive another signal during the normal operation of the integrated circuit to perform another function in accordance with the teachings of the present invention.

Figure 7:
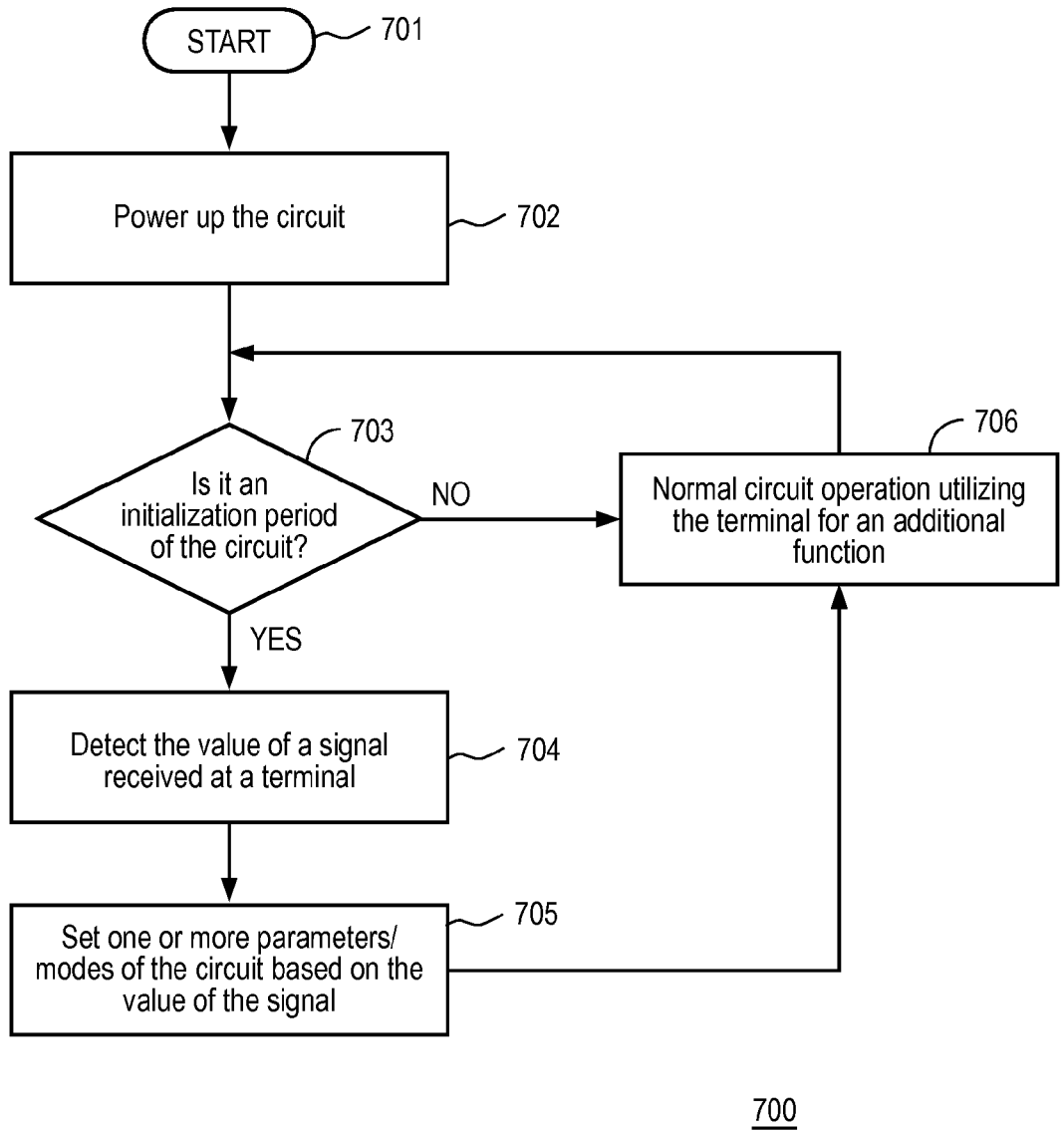
FIG. 7 shows an example flowchart showing generally the operation of a control circuit in accordance with the teachings of the present invention.

FIG. 7 shows an example flowchart 700 showing generally the operation of a control circuit in accordance with the teachings of the present invention. As shown, operation starts at block 701 and the circuit is powered up at block 702. At block 703 a decision is made as to whether the control circuit is in an initialization period. If so, then at block 704 the value of a signal received at one of the terminals of the circuit is detected and at block 705 a parameter/mode of the circuit is set based on the value of the signal detected in block 704. Processing then proceeds from block 705 to block 706, where the circuit operates normally using the terminal for an additional function during normal operation of the circuit. Block 706 is also entered if, at block 703, it is determined that it is not an initialization period of the circuit.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply, comprising:
   an energy transfer element coupled between an input and an output of the power supply;
   a switch coupled to an input of the energy transfer element;
   a threshold detection circuit included in an integrated circuit coupled to measure a signal from a first resistive external circuit coupled between a fourth external terminal of the integrated circuit and a first external terminal of the integrated circuit during an initialization period after the fourth external terminal has been charged to a supply threshold value;
   a regulator circuit coupled between a second external terminal of the integrated circuit and the fourth external terminal, the regulator circuit coupled to charge the fourth external terminal to the supply threshold value during the initialization period of the integrated circuit; and
   a selection circuit coupled to the threshold detection circuit to select a parameter/mode of the integrated circuit in response to the signal measured from the first resistive external circuit during the initialization period of the integrated circuit.

2. The power supply of claim 1 where the switch is included in the integrated circuit and is coupled between the second external terminal and a third external terminal of the integrated circuit.

3. The power supply of claim 2 wherein the parameter/mode comprises a peak current threshold level of a current flowing in the switch.

4. The power supply of claim 2 wherein the parameter/mode comprises a parameter that sets an adjustment of a peak current threshold level of a current flowing in the switch in response to an input voltage of the power supply.

5. The power supply of claim 4, wherein the parameter/mode further comprises a peak current threshold level in the switch at a certain value of the input voltage.

6. The power supply of claim 1 wherein the fourth external terminal of the integrated circuit comprises a supply terminal of the integrated circuit such that the first resistive external circuit is coupled between the supply terminal of the integrated circuit and the first external terminal of the integrated circuit.

7. The power supply of claim 1 wherein the parameter/mode that is selected by the selection circuit during the initialization period of the integrated circuit comprises an operating frequency of the integrated circuit.

8. The power supply of claim 7 wherein the operating frequency of the integrated circuit is a maximum operating frequency of the integrated circuit.

9. The power supply of claim 1 wherein the signal measured from the first resistive external circuit is a current.

10. The power supply of claim 1 wherein the first external terminal of the integrated circuit is further coupled to receive a feedback signal during normal operation of the power supply at times other than the initialization period of the integrated circuit.

* * * * *